US008089956B2

(12) United States Patent
Gu et al.

(10) Patent No.: US 8,089,956 B2
(45) Date of Patent: Jan. 3, 2012

(54) METHOD AND SYSTEM FOR IMPLEMENTING COMMUNICATIONS

(75) Inventors: Jiongjiong Gu, Shenzhen (CN); Dongming Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1417 days.

(21) Appl. No.: 11/562,237

(22) Filed: Nov. 21, 2006

(65) Prior Publication Data

US 2007/0121608 A1 May 31, 2007

Related U.S. Application Data

(63) Continuation of application No. PCT/CN2005/001635, filed on Sep. 30, 2005.

(30) Foreign Application Priority Data

Sep. 30, 2004 (CN) .......................... 2004 1 0084824
Jan. 24, 2005 (CN) .......................... 2005 1 0002618

(51) Int. Cl.
*H04L 12/66* (2006.01)
*H04W 4/00* (2009.01)

(52) U.S. Cl. ........................................ 370/354; 370/356
(58) Field of Classification Search ........................ None
See application file for complete search history.

(56) References Cited

U.S. PATENT DOCUMENTS

| 6,512,761 | B1 | 1/2003 | Schuster et al. ............... 370/352 |
| 6,996,410 | B2 | 2/2006 | Bos et al. |
| 2002/0142749 | A1* | 10/2002 | Muniere et al. ............... 455/403 |
| 2003/0026245 | A1 | 2/2003 | Ejzak |
| 2003/0128694 | A1 | 7/2003 | Hundscheidt et al. |
| 2004/0190498 | A1 | 9/2004 | Kallio et al. |
| 2004/0242225 | A1 | 12/2004 | Wang |
| 2005/0058125 | A1* | 3/2005 | Mutikainen et al. ........... 370/354 |
| 2006/0209675 | A1* | 9/2006 | Jacobson ....................... 370/216 |
| 2007/0058789 | A1* | 3/2007 | Lim et al. ..................... 379/88.17 |
| 2007/0147305 | A1* | 6/2007 | Farley et al. .................. 370/331 |

(Continued)

FOREIGN PATENT DOCUMENTS

CN 1296707 A 5/2001

(Continued)

OTHER PUBLICATIONS

Author Unknown, 3GPP TR 23.899 V 0.3.0, pp. 1-28, Sep. 6, 2004.*

(Continued)

*Primary Examiner* — Ian N Moore
*Assistant Examiner* — Christopher Crutchfield
(74) *Attorney, Agent, or Firm* — Slater & Matsil, L.L.P.

(57) ABSTRACT

The present invention discloses a method and a system for implementing communication for a CSI terminal, the system includes: an IP Multimedia Subsystem Terminal Module (IMS TM), a Circuit Switched Terminal Module (CS TM), a CS/IMS interworking gateway. The method includes: the IMS IM indicates the CS TM to establish a CS/IMS interworking call connection from the CS TM to the IMS TM, and establish a CS bearer between the CS TM and CS/IMS interworking gateway, the IMS TM correlated controls the two sessions respectively with the CS/IMS interworking gateway and the peer side, so as to make the media components it exchanged with the peer side be exchanged between the peer side and the CS/IMS interworking gateway via IP bearer, and then be exchanged between the CS/IMS interworking gateway and the CSI terminal through the established CS bearer. Thus the present invention ensures the communication of the CSI terminal.

35 Claims, 7 Drawing Sheets

U.S. PATENT DOCUMENTS

2010/0197335 A1\* 8/2010 Jin et al. .................. 455/518

FOREIGN PATENT DOCUMENTS

| CN | 1321380 A | 11/2001 |
|---|---|---|
| CN | 1482777 A | 3/2004 |
| CN | 1177508 A | 11/2004 |
| CN | 1297124 C | 1/2007 |
| CN | 100352295 C | 11/2007 |
| EP | 1 021 053 A2 | 7/2000 |
| EP | 1 161 104 A1 | 12/2001 |
| WO | WO-00/70893 A1 | 11/2000 |
| WO | WO-02/17592 A2 | 2/2002 |
| WO | WO-03/003767 A1 | 1/2003 |

OTHER PUBLICATIONS

Paul A. Pangalos, Konstantinos Boukis, Louise Burness, Alan Brookland, Caroline Beauchamps, A. H. Aghvami, End-to-End SIP Based Real Time Application Adaptation During Unplanned Vertical Handovers, Proceedings of GLOBECOM 2001, pp. 3488-3493.\*

3GPP, "Report on Alternative Architectures for Combing CS Bearers with IMS; Release 6," 3GPP TR 23.899 VO. 3.0 (2004) Available On-line at: http://www.3gpp.org/ftp/Specs/archive/23%5Fseries/23.899/23899-030.zip.

Supplementary European Search Report for Application No. EP 05 80 2141, dated May 8, 2007.

International Search Report for PCT/CN2004/001635, mailed Jan. 5, 2006.

3GPP, "3rd Generation Partnership Project; Technical Specification Group Core Network: IP Multimedia Call Control Protocol based on Session Initiation Protocol (SIP) and Session Description Protocol (SDP); Stage 3 (Release 6)," 3GPP TS 24.229 v6.4.0 (2004).

3GPP, "3rd Generation Partnership Project; Technical Specification Group Services and System Aspects; IP Multimedia Subsystem (IMS); Stage 2 (Release 6)," 3GPP TS 23.228 v6.7.0 (2004).

3GPP, "3rd Generation Partnership Project; Technical Specification Group Services and System Aspects; Report on Alternative Architectures for Combining CS Bearers with IMS; Release 6," 3GPP TR 23.899 v0.3.0 (2004).

3GPP, "Architecture Configurations in Alternative A," 3GPP TSG-SA2 (2004).

International Preliminary Report on Patentability for Application No. PCT/CN2005/001635, dated Apr. 3, 2007.

Written Opinion of the International Searching Authority, International Application No. PCT/CN2005/001635, dated Jan. 5, 2006, 3 pages.

\* cited by examiner

METHOD AND SYSTEM FOR IMPLEMENTING COMMUNICATIONS

CROSS-REFERENCES TO RELATED APPLICATIONS

This is a continuation of International Application No. PCT/CN2005/001635, which was filed on Sep. 30, 2005, and which, in turn, claimed the benefit of Chinese Patent Application No. 200410084824.8, which was filed on Sep. 30, 2004, and Chinese Patent Application No. 200510002618.2, which was filed on Jan. 24, 2005, the entire disclosures of which are hereby incorporated herein by reference.

BACKGROUND OF THE DISCLOSURE

1. Field of the Technology

The present invention relates to the techniques of combining Circuit Switched bearer with IP multimedia subsystem services (CSI), more particularly to a method and a system for ensuring communications of a CSI terminal.

2. Background of the Invention

The traditional telecommunication network includes a Circuit Switched (CS) domain and a Packet Switched (PS) domain, performing CS services (including voices, data services of CS type, faxes, etc.) and PS services respectively. At present, based on the emerging trend of the Internet and the telecommunication networks, the 3rd Generation Partnership Project (3GPP) introduces an IP Multimedia Subsystem (IMS) based upon the original PS domain. The object of the IMS is to provide multimedia communication experience for users according to individuating user data, shielding access methods of users.

Both signaling and media streams of the IMS are born by the PS domain. Since in the PS domain, the network resources are used in a shared mode, which is different from the dedicated mode in the CS domain, for real-time services, e.g. voice, the transmission quality will be obviously degraded when the PS bearer instead of the CS bearer is adopted, and it may be impossible to satisfy the service requirement of operators and users. Therefore, 3GPP provides the CSI service which combines the CS bearer with the IMS service, i.e. multimedia services are implemented by combining the PS bearer and the CS bearer, while the CS bearer is still adopted for real-time services such as voice, and the PS bearer is adopted for other non-real-time services such as pictures and messages, and meanwhile, the IMS provides the uniform control.

FIG. 1 is a schematic diagram illustrating an implementation of the CSI service which combines the CS bearer and the IMS service. As shown in FIG. 1, the CSI service provides the same service experience as that of the multimedia service provided by the IMS to the end user, but the transmission delay for the real-time media component is greatly reduced by using the CS bearer.

At present, 3GPP TS 23.899 provides a logical function architecture for implementing the CSI service, which is shown in FIG. 2. As shown in FIG. 2, the architecture includes a Circuit Bearer Control Function (CBCF), a Circuit Bearer Originating Function (CBOF), and a Circuit Bearer Terminating Function (CBTF). The CBCF determines and controls the establishment of the CS bearer between the CBOF and the CBTF. The above three functions can be implemented in existing IMS functions, e.g. a User Equipment (UE), and an Application Server (AS). The detailed location can be negotiated during the establishment of a session. The CBOF or the CBTF can also be a Session Initial Protocol User Agent (SIP UA), thus establishing the CS bearer between the CBOF or the CBTF and the peer side means establishing the CS bearer between a CS/IMS interworking gateway representing the CBOF or the CBTF and the peer side.

The 3GPP TS 23.899 provides two modes for the establishment of the CS bearer: end-to-end mode and end-to-gateway mode. In the end-to-gateway mode, the bearer is established between a terminal and a gateway, and the CS bearer can be established in either a client-to-network direction or a network-to-client direction. The choice is independent of the session direction. In addition, the 3GPP TS 23.899 also provides principles that the CSI should follow and problems to be solved, e.g. only the IMS and CSI-capable UEs can be impacted when the CSI service is implemented, and other network entities, UEs, and interworking signalings between the IMS and other networks shall not be impacted. It is possible to perform charging correlation of CS/PS/IMS, and ensure the consistent of the end-user charging.

SUMMARY OF THE INVENTION

The present invention is to provide a method and a system for implementing communications, so as to ensure the communications of a terminal supporting the Combining Circuit Switched bearer and IP Multimedia Subsystem (CSI) service.

The technical solution of the present invention is as follows:

A method for implementing communications, including following steps:
  A. an IP Multimedia Subsystem (IMS) terminal Module (TM) in a CSI terminal indicates a Circuit Switched (CS) TM in the same CSI terminal to initiate a CS bearer establishment;
  B. the CS TM takes the IMS TM as a called party and sending a call establish request to a CS domain call control function;
  C. the CS domain call control function routes the call establish request to a CS/IMS interworking gateway according to the called party number information in the received request;
  D. the CS/IMS interworking gateway converts the received call establish request into an IMS session establish request, and then sends it to the IMS TM;
  E. the IMS TM performs the correlated control between two sessions, wherein one is between the IMS TM and the CS/IMS interworking gateway, and the other is between the IMS TM and a peer side, so as to implement the CSI service.

A method for implementing communications and applicable to the case that, the CS bearer established during a procedure of implementing the CSI service is abnormally released, includes steps of:
  a. releasing the CS bearer between a CS TM and the corresponding CS domain call control function, and the CS bearer between the CS domain call control function and the corresponding CS/IMS interworking gateway;
  b. the CS/IMS interworking gateway releases the corresponding IMS session with the IMS TM corresponding to the CS TM;
  c. the IMS TM establishes a Packet Switched (PS) bearer by a re-negotiation procedure, and exchanges the media components with the peer side using the established PS bearer, instead of the previous CS bearer.

A system for implementing communications includes:

a CS domain call control function, used for interacting with a CS TM and establishing a CS bearer, and routing a corresponding CS call establish request to a CS/IMS interworking gateway;

the CS/IMS interworking gateway, used for converting the CS call establish request routed from the CS domain call control function, into an IMS session establish request, and sending the IMS session establish request to the IMS TM, which correlated with the CS TM initiating the request for the CS bearer establishment, through an IMS session control function, thus establishing a CS to IMS interworking call between the CS TM and the IMS TM; moreover, the CS/IMS interworking gateway is used for sending the IP address and port information of the IP port resource reserved for exchanging media components to the IMS TM, and transferring the media components it received from the IMS side to the CS TM, using the IP port, through the CS bearer established between the CS/IMS interworking gateway and the CS TM, and vice versa;

the IMS TM, used for implementing CS bearer control function, judging and indicating the CS TM to initiate the CS bearer establishment during an IMS service, completing the correlated control upon the two sessions it established respectively with the peer side and the CS/IMS interworking gateway in a Back-To-Back User Agent (B2BUA) mode after receiving the IMS session establish request which is sent from the CS/IMS interworking gateway, and therefore, making the media components the peer side means to transmit to IMS TM, be transmitted by the peer side to the IP port the CS/IMS interworking gateway reserved for exchanging the media components with the IMS TM, and then be transmitted to the CSI terminal through the CS bearer established between the CS TM and the CS/IMS interworking gateway;

the CS TM, used for initiating a call establish request by taking the IMS TM as a called party after receiving an instruction from the IMS TM, and completing the establishment of the CS bearer by interacting with the CS/IMS interworking gateway.

The present invention provides a solution for implementing the CSI service in end-to-gateway/client control mode, the solution includes the method for implementing the CBCF in the CSI terminal, and the implementation of the CSI service under the cooperation of the CSI terminal and related CS/IMS domain network entities, i.e. the CS domain call control function or the IMS domain Call Session Control Function (CSCF). The invention also provides a solution for the problem of dealing with the situation when the CS bearer is abnormally released. Therefore, the present invention provides a feasible and practical technical solution for implementing the CSI service on the CSI terminal, which insures the implementation of the CSI service on the CSI terminal.

DETAILED DESCRIPTION OF THE PREFERRED EMBODIMENTS

The present invention will be described in detail hereinafter with reference to the accompanying drawings and specific embodiments.

Currently, no specific implementing procedure is provided for the terminals, namely, the CSI terminals, with the CSI control function to implement the CSI service, which greatly limits the adaptability and the expandability of the CSI service. To remedy the disadvantage, a method for CSI terminals to implement communication is provided. Specifically, the IMS TM in the CSI terminal indicates the CS TM in the CSI terminal to establish a CS bearer, according to the need of the current IMS service established with the peer side; the CS TM sends a request for establishing a CS bearer to the CS domain call control function so as to establish the CS bearer, by taking the IMS TM as the called party; the CS domain call control function sends a CS call establish request to the CS/IMS interworking gateway, according to the called party number information in the received request for establishing the CS bearer; the CS/IMS interworking gateway converts the CS call establish request into an IMS session establish request, and then sends the IMS session establish request to the IMS TM; the IMS TM performs a correlated control upon the two sessions, wherein one session is between the IMS TM and the CS/IMS interworking gateway, and the other session is between the IMS TM and the peer side, so as to establish an IMS session connection between the IMS TM and the peer side, and establish an IMS to CS interworking connection between the IMS TM and the corresponding CS TM through the CS/IMS interworking gateway. During the procedure of establishing the IMS to CS interworking connection, a CS bearer between the CS TM and the CS/IMS interworking gateway is established, meanwhile, through the correlated control on the two sessions by the IMS TM, the real-time media components which are exchanged with the peer side and need to be transmitted by the CS bearer in a CSI service, can be transmitted to the CSI terminal through two segments of bearers, one is the IP bearer between the peer side and the CS/IMS interworking gateway, the other is the CS bearer between the CS/IMS interworking gateway and the CS TM.

In addition, when the CSI terminal receives an incoming IMS session that needs to invoke the CSI service, and finds that the conditions for implementing the CSI service are currently not satisfied, the CSI terminal can further performs a fallback procedure, by which the CSI terminal can continue to communicate with the peer side by a CSI fallback CS call.

Figure 1:
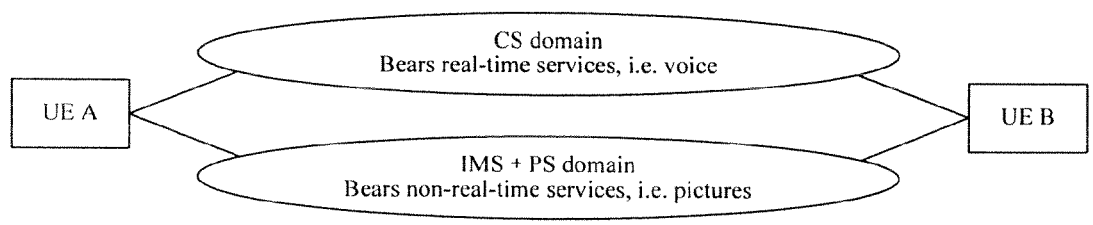
FIG. 1 is a schematic diagram illustrating a CSI service that combines a CS bearer and an IMS service.
Figure 2:
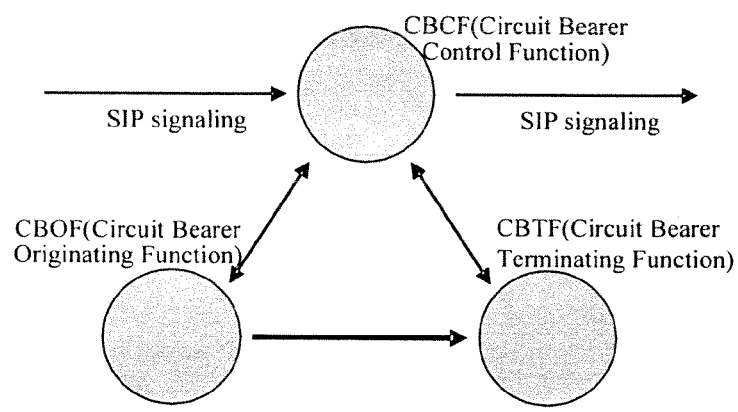
FIG. 2 is a schematic diagram illustrating a logical function architecture for implementing the CSI service.
Figure 3:
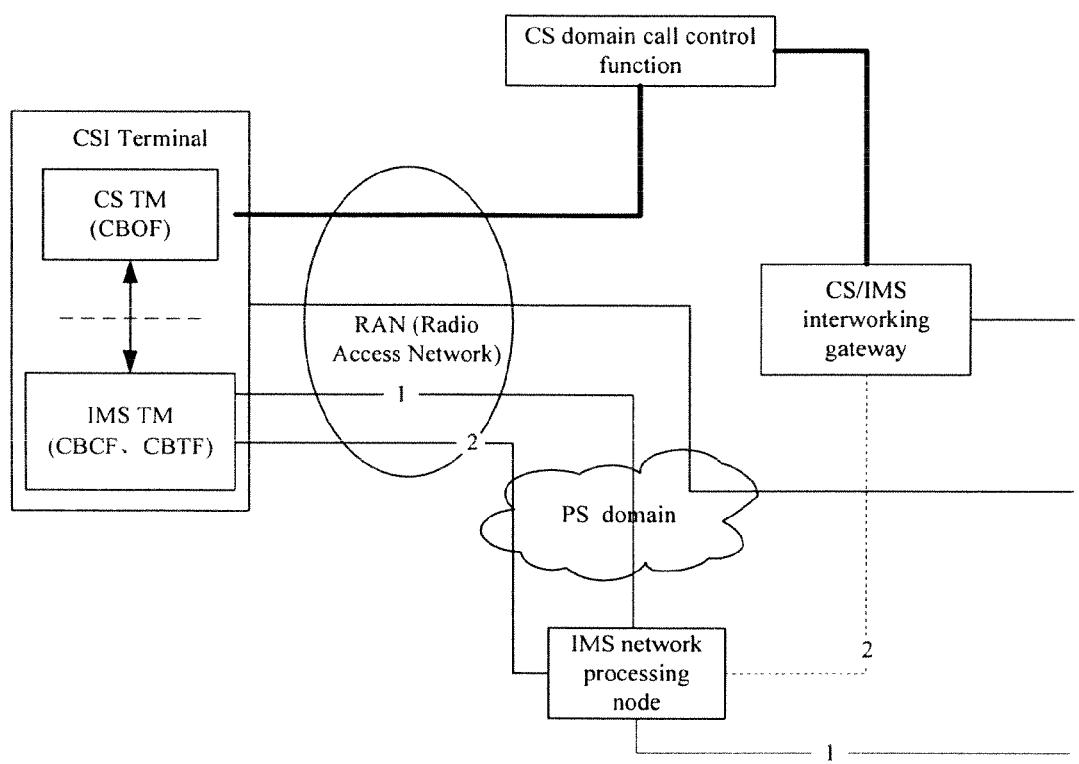
FIG. 3 is a schematic diagram illustrating a system according to an embodiment of the present invention.

As shown in FIG. 2, the embodiment of the present invention provides a system under the end-to-gateway/client control mode, and a schematic diagram illustrating the system is shown in FIG. 3. With reference to FIG. 3, the system includes: a CSI terminal, a CS domain call control function and a CS/IMS interworking gateway, therein, the CSI terminal includes: an IMS TM for implementing the CBCF and the CBTF, and a CS TM for implementing the CBOF, wherein:

the CS domain call control entity, e.g. a Mobile Switch Center (MSC), is used for interacting and establishing a CS bearer with the CS TM upon receiving a request for establishing a CS bearer sent from the CS TM, and routing a corresponding CS call establish request to a CS/IMS interworking gateway, i.e. establishing the CS bearer from the CS TM to the CS/IMS interworking gateway through the CS call control entity; moreover, it is used for sending a request for establishing a CSI fallback CS call to the CS TM when receiving the CS call establish request for establishing a CSI fallback CS call from the CS/IMS interworking gateway, or sending the CS call establish request for establishing a CSI fallback CS call to the CS/IMS interworking gateway when receiving the request for establishing a CSI fallback CS call from the CS TM.

The CS/IMS interworking gateway is used for interacting with the CS TM to establish the CS bearer, converting the CS call establish request routed from the CS domain call control function into an IMS session establish request, and sending the IMS session establish request to the IMS TM which is correlated with the CS TM initiating a request for establishing a CS bearer, through an IMS session control function; furthermore, when receiving an IMS session establish request for establishing a CSI fallback CS call, it is further used for converting the received IMS session establish request for establishing a CSI fallback CS call into a CS call establish request for establishing a CSI fallback CS call, and sending the CS call establish request for establishing a CSI fallback CS call to the CS call control function; or, converting the CS call establish request for establishing a CSI fallback CS call, which is sent by the CS TM through the CS call control function, into an IMS session establish request for establishing a CSI fallback CS call and sending the converted request to the peer side.

The connection established between the CS TM and the IMS TM trough the CS/IMS interworking gateway can be illustrated by the fine line path and dotted line path labelled as 2 in FIG. 3; moreover, the CS/IMS sends the IP address and the port information of the IP port resource reserved for exchanging media components with the IMS TM, and transfers the media components received from the IMS side using the IP port, to the CS TM through the CS bearer established between them, and vice versa.

The IMS TM is used for implementing the CS bearer control function, judging and indicating the CS TM initiate the CS bearer establishment during the IMS service with the peer side, completing the correlated control upon the two sessions established respectively with the peer side and the CS/IMS interworking gateway in a B2BUA mode after receiving the IMS session establish request which is sent by the CS/IMS interworking gateway, and therefore, the media components which the peer side means to transmit to the IMS TM, are transmitted by the peer side to the IP port reserved in the CS/IMS interworking gateway for exchanging media components with the IMS TM, and then are transmitted to the CSI terminal through the CS bearer established between the CS TM and the CS/IMS interworking gateway; furthermore, when receiving an IMS session establish request from the peer side and determining that the conditions for implementing the CSI service are currently not satisfied, it is further used for responding an IMS session redirection or release indication to the peer side, and releasing the IMS session being established between itself and the peer side.

The CS TM is used for initiating the request for establishing CS call by taking the IMS TM as a called party after receiving an instruction from the IMS TM, and completing the establishment of the CS bearer by interacting with the CS/IMS interworking gateway through CS call control function; or, establishing a CS to IMS interworking CSI fallback CS call with the peer side through the CS call control function and the CS/IMS interworking gateway when receiving the request for establishing a CSI fallback CS call sent by the CS call control function; or, establishing a CS to IMS interworking CSI fallback CS call with the peer side by initiating the request for establishing a CSI fallback CS call to the CS call control function, taking the peer side as the called party.

With reference to FIG. 3, the heavy line denotes the CS bearer and the path of signals, the fine line denotes the PS bearer path and the dotted line denotes the path of the SIP messages, when there are media components which need to be transmitted upon the CS bearer included in the media components exchanged between the two users in an IMS service, the media components thereof can be transmitted from the peer side to the CS/IMS interworking gateway through the IP bearer and then be transmitted from the CS/IMS interworking gateway to the CS TM of the CSI terminal through the CS bearer denoted as the heavy line in FIG. 3, which is established between them. Thus the CSI service is implemented by the system.

In the system, the IMS TM and the CS TM can be either co-located or not be co-located in the same terminal. When the IMS TM and the CS TM are not co-located, they can communicate with each other by short-distance wireless communication methods, such as, but are not restricted to, Bluetooth, etc. Furthermore, the IMS TM can be implemented by the following ways: PC or PDA, i.e. the IMS TM can be implemented by software inside the PC or PDA.

In addition, the CS TM and the IMS TM store their E.164 numbers respectively, and their E.164 numbers can be stored in their respective store modules; in case of that the IMS TM and the CS TM are co-located, their E.164 numbers can also be stored in a data area shared by the CS TM and the IMS TM.

Figure 4:
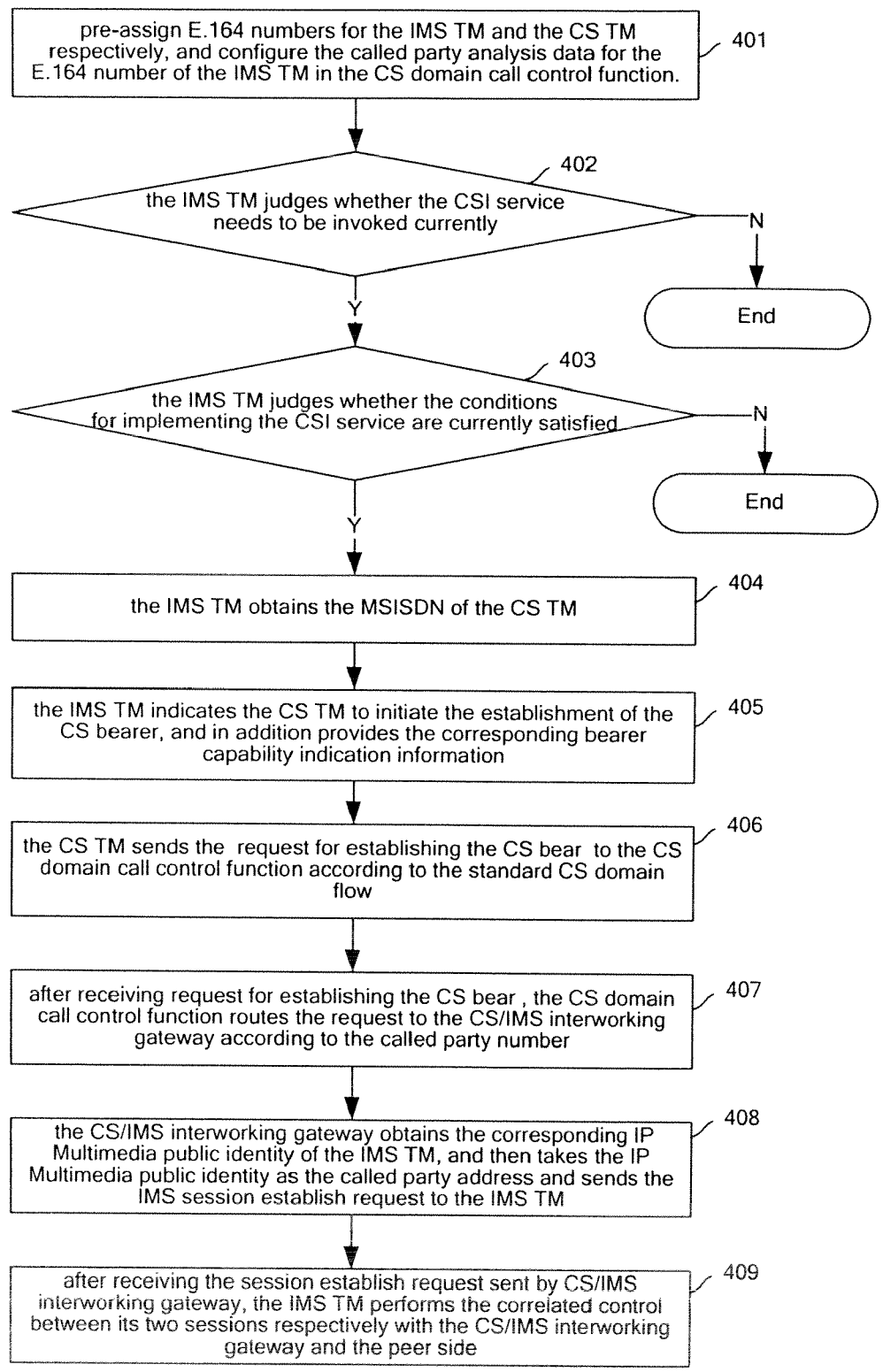
FIG. 4 is a flowchart for implementing the CSI service using a CSI terminal according to an embodiment of the present invention.

FIG. 4 is a flowchart for implementing the CSI service using the CSI terminal according to an embodiment of the present invention. With reference to FIG. 3 and FIG. 4, according to the system of the present embodiment, the procedure of implementing the CSI service at the CSI terminal includes the following steps:

Step 401: pre-assigning E.164 numbers for the IMS TM and the CS TM respectively, and configuring the called party analysis data for the E.164 number of the IMS TM in the CS domain call control function.

The E.164 numbers assigned for the CS TM and the IMS TM can effectively identify the CS TM and the IMS TM in the CS network and the IMS network. For example, the E.164 number assigned for the CS TM is the subscribed MSISDN of the user to whom the CS TM belongs in the CS domain, and the E.164 number assigned for the IMS TM is the subscribed number of the user to whom the IMS TM belongs in the IMS network.

The called party analysis data is configured at the CS domain call processing nodes, i.e. each node in the CS domain that needs to transmit the call, e.g. CS domain call control function in the system of the present embodiment, so that, in the subsequent procedure, it can route the call to the CS/IMS interworking gateway. Furthermore, by configuring the called party analysis data in each call processing node, the call processing node in the CS domain can identify the current service as the CSI service in the subsequent procedure, and thereby perform special charging and service process.

In addition, in the step 401, the E.164 number allocated for the IMS TM can include a prefix identifying an area and/or service type. Therefore, the CS domain call processing nodes can determine the route of the call according to the prefix identifying an area and/or the service type in subsequent procedure, and/or identifying the current service as the CSI service, and then performing the special charging and service process in the subsequent procedure.

Step 402: the IMS TM, as the CS bearer control function, judges whether the CSI service needs to be invoked currently, if the CSI service needs to be invoked currently, executes step 403; otherwise, ends the current procedure of establishing the CSI service.

The IMS TM executes the judging step in the following cases: preparing to initiate an IMS session establish request, or receiving an IMS session establish request from the peer side, or preparing to initiate a re-negotiation request to or receiving a re-negotiation request from the peer side during an established IMS session.

In addition, the IMS TM can determine whether to invoke the CSI service by judging whether the media components to be exchanged between itself and the peer side need to be transmitted through the CS bearer, i.e. judging whether there exists real-time media component, e.g. voices, etc., in the media components to be exchanged.

Step 403: the IMS TM judges whether the conditions for implementing the CSI service are satisfied at present, if yes, executes step 404, otherwise, ends the current procedure.

The IMS TM can determine whether the conditions for implementing the CSI service are currently satisfied by judging whether the cell to which it currently accesses has the simultaneous CS and PS service capability, and can further determine the willingness of the user. In other words, if the cell to which it currently accesses has the DTM or MultiRAB capability, and furthermore, if the IMS TM determines the user is willing to perform CSI service, then the IMS TM determines that the conditions for implementing the CSI service are currently satisfied.

In the step 403, the willingness of the user can be determined by the following ways:
(1) by providing a special user interface on the IMS TM, e.g. a pop-up menu, and interacting with the user in real-time;
(2) by the pre-configuration of the user in the IMS TM.

Step 404: the IMS TM obtains the MSISDN of the CS TM.

If the IMS TM and the CS TM are not co-located in the same terminal, the IMS TM can obtain the MSISDN of the CS TM by real-time interaction or pre-interaction with the CS TM. The procedure of obtaining the MSISDN of the CS TM through the real-time interaction includes: the IMS TM firstly sending a request to the CS TM through a interface between them, after receiving the request, the CS TM sending the MSISDN of its own to the IMS TM, and then the IMS TM obtaining the MSISDN of the CS TM; the procedure of obtaining the MSISDN of the CS TM through the pre-interaction includes: when the CSI terminal, including the IMS TM and the CS TM, is enabled, the IMS TM sending a request to the CS TM, after receiving this request, the CS TM sending the MSISDN of its own to the IMS TM, and the IMS TM storing the received MSISDN in its buffer. In this way, the procedure for implementing the current step is: the IMS TM obtaining the stored MSISDN of the CS TM from its own buffer.

If IMS TM and CS TM are co-located in the same terminal, the above-mentioned procedure of the current step is an internal interactive procedure between modules within the same terminal, wherein, if the MSISDN of the CS TM are stored in a shared data area, the procedure of implementing the current step is: the IMS TM obtaining the MSISDN of the CS TM from the shared data area.

Step 405: the IMS TM indicates the CS TM to initiate the establishment of the CS bearer.

If the IMS TM and the CS TM are co-located in the same terminal, the procedure of the current step is an internal interactive procedure between modules inside one terminal, in other words, the IMS TM indicates the CS TM to initiate the establishment of the CS bearer through internal instructions, furthermore, the indication includes corresponding bearer capability indication information;

If the IMS TM and the CS TM are not co-located in the same terminal, the procedure of the current step is: the IMS TM sending to the CS TM a CS establish request by short-distance wireless communication methods such as Bluetooth and the CS bearer establish request which carries the corresponding bearer capability indication information.

In current step, if the CS TM can not obtain the E.164 number of the IMS TM by directly accessing to a number storage module of the IMS TM, the IMS TM will further carry the E.164 number of itself in the indication.

Furthermore, in current step, the IMS TM can also carry its SIP URI in the indication, so as to make it convenient for the CS/IMS interworking gateway to obtain the IP Multimedia public identifier of the IMS TM.

Step 406: the CS TM sends the call establish request to the CS domain call control function according to the standard CS domain flow.

The CS TM takes its MSISDN as the calling party number, takes the E.164 number of the IMS TM as the called party number, the E.164 number of the IMS TM is obtained from the number storage module of the IMS TM or from the CS bearer establish indication/request sent by the IMS TM, and the CS TM fills in the bearer capability indication in the call establish request sent by itself according to the bearer capability indication information provided by the IMS TM.

If the IMS TM provides its SIP URI address to the CS TM, then, in the current step, the CS TM can carry the SIP URI of the IMS TM by a User-to-User Information (UUI) element included in the call establish request it send to the CS domain call control function.

Step 407: after receiving the call establish request the CS domain call control function routes the call establish request to the CS/IMS interworking gateway according to the called party number.

The CS domain call control function, e.g. the MSC, determines to route the call to the CS/IMS interworking gateway, according to the pre-configured called party analysis data and the called party number in the call establish request it received, namely the E.164 number assigned for the IMS TM which initiates the CS bearer establish procedure. From then on the CS TM and the CS/IMS interworking gateway interact with each other according to the standard CS call establish procedure, and finally establish the CS bearer between them.

Besides, if the called party number received by the CS domain call control function, i.e. the E.164 number assigned for the IMS TM, includes a service type prefix, i.e., a prefix identifying the CSI service, then, in the current step, by configuring the route corresponding to the service type prefix in the called analysis data point to the nearest CS/IMS interworking gateway, the CS domain call control function will forward the call establish request to the nearest CS/IMS interworking gateway by analyzing the service type prefix, and thus avoiding the occupancy of long distance CS trunk.

In addition, if the called party number received by the CS domain call control function, i.e. the E.164 number assigned to the IMS TM, includes an area identification prefix, i.e., a prefix identifying the area the user belongs to, then in the current step, by configuring the route corresponding to the area identification prefix in the called analysis data point to the CS/IMS interworking gateway in corresponding area, the CS domain call control function will forward the call establish request to the CS/IMS interworking gateway in the home network of the user who own the IMS TM by analyzing the area identification prefix, so that the CSI service can be implemented reliably even when the IMS TM is roaming.

Furthermore, if the CS domain call control function receives the UUI including the SIP URI of the IMS TM in previous step, it will also send the UUI to the CS/IMS interworking gateway in current step.

To be explained, the CS domain call control function and the CS/IMS interworking gateway can also be co-located in one network entity, in such a case, the current step can be deleted from the whole procedure, i.e. step 408 is directly executed after finishing the step 406.

Step 408: the CS/IMS interworking gateway obtains the corresponding IP Multimedia public identity of the IMS TM, and then takes the IP Multimedia public identity as the called party address and sends the IMS session establish request to the IMS TM.

As mentioned above, the IP Multimedia public identity of the IMS TM can be a SIP URI converted from the above-mentioned E.164 number assigned for the IMS TM, in other words, the mapping relationship between the E.164 number assigned to the IMS TM and the IP Multimedia public identity of the IMS TM can be pre-configured in the ENUM server, thus in the current step, the CS/IMS interworking gateway MGCF/IM-MGW can obtain the IP Multimedia public identity of the IMS TM by inquiring the ENUM server according to the called party number carried in the call establish request, i.e. the E.164 number assigned to the IMS TM. Moreover, an authorization procedure for the CSI service is also completed by inquiring the ENUM server, i.e. the IMS TM is allowed to apply the CSI service, if the conversion data of the E.164 number assigned for the IMS TM in the ENUM server is found.

In the step, the IMS domain public identifier is of the SIP URI format, the SIP URI addressing is adopted in the IMS domain; therefore, if the CS/IMS interworking gateway receives the SIP URI address of the IMS TM carried in the UUS, in the step, CS/IMS interworking gateway can also obtain the SIP URI address, i.e. the IMS domain public identifier of the IMS TM, directly from the UUS.

To be explained, in current step, the CS/IMS interworking gateway obtains the MSISDN number of the CS TM from the calling party number in the received call establish request, and sent the IMS session establish request to the IMS TM with the obtained MSISDN of the CS TM in the "From" (source) header field.

In addition, in current step, the CS/IMS interworking gateway MGCF/IM-MGW indicates the IM-MGW to reserves port resource for the media components exchanged at the IMS side according to the standard CS to IMS interworking procedure, and continues to forward the IMS session to the above-mentioned IMS TM through the IMS network, i.e. the interworking gateway sends the IMS session establish request to the IMS TM which initiates this procedure of the CS bearer establishment.

In current step, the CS/IMS interworking gateway includes the IP address and UDP port information of the above-mentioned port resource it reserved for the IMS side in the SDP included in the transmitted session establish request, so that the CSI terminal can used the port resource to exchange media components with the peer side in subsequent procedure.

Step 409: after receiving the session establish request sent by CS/IMS interworking gateway, the IMS TM performs the correlated control between its two sessions respectively with the CS/IMS interworking gateway and the peer side.

The Specific process of the correlated control includes:

1. the IMS TM obtains the MSISDN in the "From" (source) header field of the IMS session establish request, and judges whether current obtained MSISDN is identical with that it obtained in step 404, if they are identical, it is confirmed that current IMS session establish request is the IMS call-back corresponding to the CS bearer establish procedure requested by the IMS TM, rather than a new session establish request initiated by other users;
2. the IMS TM obtains the SDP from the received session establish request, i.e. the IP address and UDP port information of the port reserved by the interworking gateway for the IMS side, takes this obtained SDP indication of the interworking gateway as its own side's SDP indication for the part media components using the CS bearer and sends to the peer side.
3. the IMS TM obtains the SDP indication of the peer side during the corresponding session establish procedure with the peer side, takes the part of the obtained SDP indication corresponding to the part of media components using the CS bearer as its own side's SDP indication and sends to the interworking gateway.

Subsequently, the IMS TM which acts as a B2BUA respectively completes the procedure of establishing the IMS call-back session with the CS/IMS interworking gateway, and the procedure of establishing the IMS session with the peer side.

The IMS TM controls the establishment of the IMS/CS interworking connection between itself and CS TM through CS/IMS interworking gateway MGCF/IM-MGW, and the IMS session between itself and the peer side; the CS bearer is established between the CS TM and the interworking gateway MGCF/IM-MGW during the establishment of the IMS/CS interworking connection between the IMS TM and the CS TM through the CS/IMS interworking gateway; furthermore, by transparently transferring the SDP indication corresponding to the part of the media components using CS bearer between the interworking gateway and the peer side (i.e. respectively taking the corresponding SDP indications sent by the gateway and the peer side as the SDP indications of its own side, and transferring the indications to the other side, i.e., respectively to the peer side and the interworking gateway). As a result, the real-time media components exchanged with the peer side, which need to be transmitted by the CS bearer in the CSI service, can be transmitted to the CSI terminal through two segments of bearers, one is the IP bearer between the peer side and the interworking gateway, and the other is the CS bearer between the interworking gateway and the CS TM.

To be explained, the media components transmitted through the CS bearer do not need the PS resource reservation at the access network of the CSI terminal side, therefore, in step 409, the IMS TM can further add a specific indication in the transmitted SDP to indicate that the media components are transmitted through the CS bearer, thus when the P-CSCF in the IMS domain receives the SDP from the IMS TM, it can recognise that this part of media components will be transmitted through the CS bearer and so there is no need to reserve PS resource for it, and performs a special process upon the resource reservation. Therein, the procedure of the IMS TM adding the specific indication in the transmitted SDP can be implemented by, but are not restricted to, expending definition of the SDP, e.g. using one description or a combination of multiple descriptions currently defined in the SDP.

By far, the procedure of establishing the CSI service connection between the CSI terminal and the peer side is finished, and then, the CSI terminal and the peer side can exchange the media components through the CS bearer between the CS TM in the CSI terminal and the CS/IMS interworking gateway and the IP bearer between the CS/IMS interworking gateway and the peer side, and thus the CSI service is implemented.

When the session is finished, the established CSI service connection needs to be released. The present embodiment also includes a procedure of releasing the CS connection established in CSI service, the specific procedure is: when the session is finished, the IMS TM which controls initiating the establishment of the CS bearer indicates the CS TM to release the established CS bearer, the CS TM initiates the CS call release request according to the standard CS procedure, after receiving the CS call release request, the CS domain call control function and interworking gateway complete the releasing of the established CS bearer, furthermore, the interworking gateway completes the releasing of its IMS domain callback session with the IMS TM, thus the whole process of releasing the CS bearer and the related CS/IMS interworking connection is finished.

The above-mentioned procedure of releasing the connection is under normal situations, i.e. releasing the CSI connection when the session with the peer side is finished. However, there exist some exceptional situations in practical application that, during the procedure of the CSI service, the established CS bearer may be abnormally released due to kinds of reasons such as the change of network environments. Therefore, solutions for such exceptional situations are also provided, including: firstly completes the releasing of the call between the CS TM and the interworking gateway following the standard procedure of the CS domain, then the MGCF of the interworking gateway releases the IMS call-back session between itself and the IMS TM, the IMS TM completes the releasing of the above-mentioned IMS call-back session, and initiates a re-negotiates procedure with the peer side to use PS bearer instead of previous CS bearer for incessancy media exchange.

Figure 5:
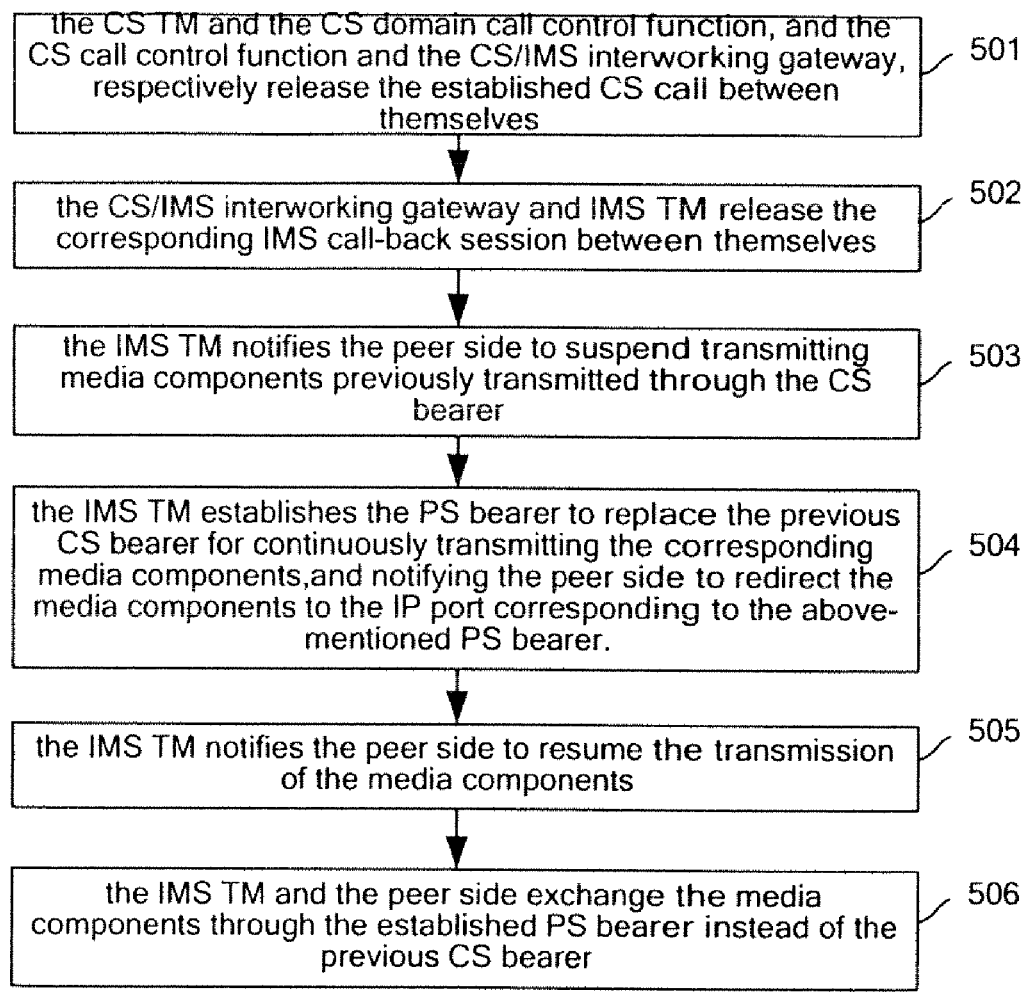
FIG. 5 is a flowchart illustrating a process in case of the CS bearer being abnormally released.

With reference to FIG. 5, when the CS bearer is abnormally released, the present embodiment includes the following steps:

Step 501: the CS TM and the CS domain call control function, and the CS call control function and the CS/IMS interworking gateway MGCF/IM-MGW, respectively release the established CS call between themselves following the standard call release procedure in the CS domain.

Step 502: the CS/IMS interworking gateway MGCF/IM-MGW and IMS TM release the corresponding IMS call-back session between themselves.

Step 503: the IMS TM notifying the peer side to suspend transmitting media components previously transmitted through the CS bearer.

Step 504: By initiating and interacting to complete a re-negotiation with the peer side, the IMS TM establishes the PS bearer to replace the previous CS bearer for continuously transmitting the corresponding media components, and notifying the peer side to redirect the media components to the IP port corresponding to the above-mentioned PS bearer.

Step 505: the IMS TM notifies the peer side to resume the transmission of the media components.

Step 506: the IMS TM and the peer side exchange the media components through the established PS bearer instead of the previous CS bearer.

By far, the corresponding procedure in the case of the CS bearer being abnormally released is completed. According to the process shown in FIG. 5, during the implementation of the CSI service, even if the CS bearer is abnormally released, normal communication of the CSI terminal can still be guaranteed.

To be explained, the procedure to ensure the communication in the case that the CS bearer is abnormally released during the CSI service implementation, which is shown in FIG. 5, is applicable for CSI services implemented under any mode, e.g. the end-to-gateway/network control mode; In addition, the procedure from step 503 to step 506 are also applicable for end-to-end mode, in other words, the procedure shown in FIG. 5 can be applied under the end-to-gateway/client control mode shown in FIG. 4, or be applied under other modes, e.g. end-to-gateway/network control mode, for the situations when the CS bearer is abnormally released during the procedure of implementing the CSI service.

Another thing to be explained is that, during the above-mentioned procedure of implementing the CSI service, the CS/IMS interworking gateway can further carry the specific indication information in the SDP included in the IMS session establish request it sends to the IMS TM by extending the SDP indication; so that in subsequent procedure, the IMS domain P-CSCF can identify that a part of the media components will be transmitted through the CS bearer according to the specific indication information, while it sends the IMS session establish request to the IMS TM, and thereby performs the special resource reservation process, i.e. does not reserve resource for this part of the media components.

Figure 6:
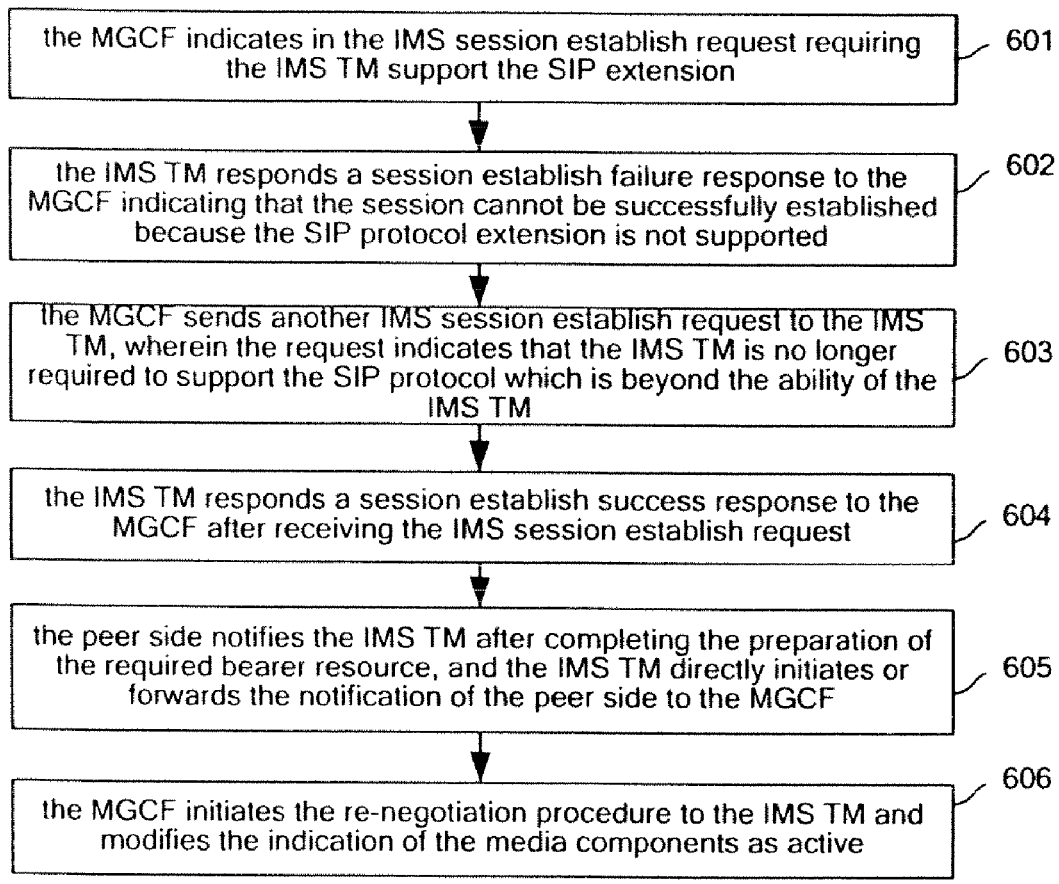
FIG. 6 is a flowchart illustrating a process when an IMS TM in the CSI terminal does not support SIP protocol extension.

In addition, in practical applications, especially when the IMS TM and the CS TM are not co-located in the same terminal, there is a situation that the IMS TM does not support the SIP extension required by 3GPP {e.g. Precondition (general resource management and SIP) defined by IETF RFC 3312, UPDATE method defined by IETF RFC 3311 and 100 Rel (reliable transfer of SIP temporary response) defined by IETF RFC 3262}, therefore, the MGCF, i.e., the CS/IMS interworking gateway adopts an End-to-End (E2E) manner to complete the negotiation procedure between 3GPP SIP and non-3GPP SIP; the MGCF can also inquire and negotiate the capability with the IMS TM through SIP correlative operations before the IMS session is initiated, and determines whether to request the SIP extension when initiating the IMS session establish procedure according to the negotiation result. FIG. 6 is a flowchart illustrating the procedure when the IMS TM in the CSI terminal does not support SIP protocol extension. With reference to FIG. 4 and FIG. 6, in order to avoid the impact to the subsequent session when the IMS TM does not support the SIP extension, the procedure from step 408 to step 409 shown in FIG. 4 further includes the following steps:

Step 601: while sending the IMS session establish request to the IMS FM, the MGCF indicates in the IMS session establish request requiring the IMS TM support the SIP extension (e.g. Precondition, etc.).

Step 602: after receiving the IMS session establish request, the IMS TM responds a session establish failure response to the MGCF which indicates that the session cannot be successfully established because the SIP protocol extension is not supported.

The procedure from step 601 to step 602 can also be: the MGCF sends an IMS capability inquiry request to the IMS TM to check if the IMS TM supports the SIP extension; the IMS TM responds to the MGCF to clarify that it does not support the SIP extension (e.g. Precondition).

Step 603: the MGCF sends another IMS session establish request to the IMS TM, wherein the request indicates that the IMS TM is no longer required to support the SIP protocol which is beyond the ability of the IMS TM.

Step 604: this time, the IMS TM responds a session establish success response to the MGCF after receiving the IMS session establish request.

Through the process shown in FIG. 6, the MGCF learns that the IMS TM does not support the SIP extension, e.g. Precondition. In other words, the IMS TM is not able to correctly notify the MGCF whether the IMS TM (which is the peer side actually) has prepared relevant bearer resource for the media components, therefore the media components to be transmitted are described as "inactive" by the session established in the above-mentioned step 603 and step 604, so as to avoid ineffectively transmitting media components by each side.

Step 605: the peer side notifies the IMS TM after completing the preparation of the required bearer resource, and the IMS TM directly initiates or forwards the notification of the peer side to the MGCF.

Step 606: the MGCF initiates the re-negotiation procedure to the IMS TM and modifies the indication of the media components as "active", so that the media components of the CSI service can be transmitted between the CSI terminal, including the IMS TM and the CS TM, and the peer side.

In the present embodiment, it is feasible to pre-configure the corresponding relationship between the E.164 numbers of the CS TM and the IMS TM respectively in each processing node in the CS domain, then it the procedure shown in FIG. 4, after each processing node in the CS domain receives the call establish request from the CS TM, since the calling party number in the call establish request is the E.164 number corresponding to the CS TM and the called party number is the E.164 number corresponding to the IMS TM, the processing node can identify that the current CS call is used to establish the CS bearer for CSI service according to the pre-configured corresponding relationship between the calling party number and the called party number in the call establish request. For example, the calling party number is the MSISDN number of the subscriber while the called party number is the telephone number of the IMS TM allocated to that subscriber when he subscribes the CSI service in the IMS domain, thus, each processing node in the CS domain can perform the correlation of charging upon the current CSI service, e.g. treat the current call as a free call or additionally charging the CS bearer in the IMS service.

Furthermore, in step 406 shown in FIG. 4, since the CS TM initiates the call establish request using the MSISDN number subscribed in the CS domain, therefore, the influence from the supplementary services and intelligent services on CS TM side, such as Outgoing Call Barring (OCB) services {including Outgoing Call Barring supplementary service and Operator Determined Barring (ODB)}, Closed User Group (CUG) and Customized Applications for Mobile network Enhanced Logic (CAMEL) services, which may restrict the establishment of the CS call or may trigger intelligent services during the establishment of the CS bearer and thus involve the control and impact by the intelligent services (e.g. changing the number, etc.), should be considered. Therefore, in order to avoid the impact from the supplementary services and the intelligent services, a method is provided: pre-assigning the special prefix, e.g. the prefix representing service type, included in the E.164 number corresponding to the IMS TM, and configuring analysis data upon the special prefix in the CS domain call control function, so as to avoid the invoking of those services, and thus avoiding the impact on the establishment of CS bearer in the CSI service. Therefore in the procedure shown in FIG. 4, the E.164 number of the IMS TM, which is obtained by the CS TM and transmitted in the CS domain, further includes the assigned special prefix, then when receiving the E.164 number with the special prefix, by analyzing the analysis data upon the special prefix, the CS domain call control function can forbid the invoking of those supplementary services and forbid the triggering of the intelligent services at the CS calling party during the establishment of the CS bearer, so as to avoid the impact on the establishment of CS bearer in the CSI service from the supplementary services and the intelligent services of the CS originating side. Practically, CS domain call control entity can also discharge the CS bearer applied in the current call or additionally charge the CS bearer in the IMS service.

During the above-mentioned procedure, when the conditions for implementing the CSI service are satisfied, i.e. the cell to which the CSI terminal currently accesses has the simultaneous CS and PS service capability, a specific solution for implementing the CSI service is provided in accordance with 3GPP TR 23.899, so as to insure the CSI terminal can implement the CSI service. Moreover, in the above-mentioned procedure of the implementation of the CSI service, the following methods are further provided: the method for avoiding the occupancy of long distance CS trunk when the CSI terminal is roaming, the method to ensure the continuity of communication when CS bearer is abnormally released, and the method to implement CSI service when the IMS TM in the CSI terminal does not support the SIP extension required by 3GPP, and the method for the correlation of charging of the CS and IMS domain as well as the method to avoid the impact on the CS bearer establishment from the supplementary services and the intelligent services, thereby the complete and abundant solution for implementing the CSI service is provided.

Since the above-mentioned procedure of implementing the CSI service is based on the fact that the cell to which the CSI terminal currently accesses has the simultaneous CS and PS service capability, and further based on the user's willingness, therefore, when the conditions for implementing the CSI service are not satisfied, i.e. the cell to which the CSI terminal currently accesses has not the simultaneous CS and PS service capability, or the user's willingness is not to use the CSI service, the procedure of CSI fallback to CS must be considered so as to ensure the communication between the CSI terminal and the peer side user. Therefore, in the step 402 of implementing the CSI service shown in FIG. 4, if the CSI terminal receives an incoming IMS session establish request from the peer side and judges that the CSI service should be triggered, however, it is found in step 403 that the conditions for implementing the CSI service are not satisfied currently, a method for CSI fallback to CS is provided, which includes two modes: in the first mode, the CSI terminal responds the call redirection indication to the peer side, the peer side initiates the IMS session again according to the redirection indication, and the CS/IMS interworking gateway converses the second IMS session into the CS call and then sends the CS call to the CS TM of the CSI terminal; in the second mode, the CSI terminal releases the IMS session being established by specific reasons and then initiates the establishment of a CS/IMS interworking connection in the CS domain to the peer side.

Figure 7:
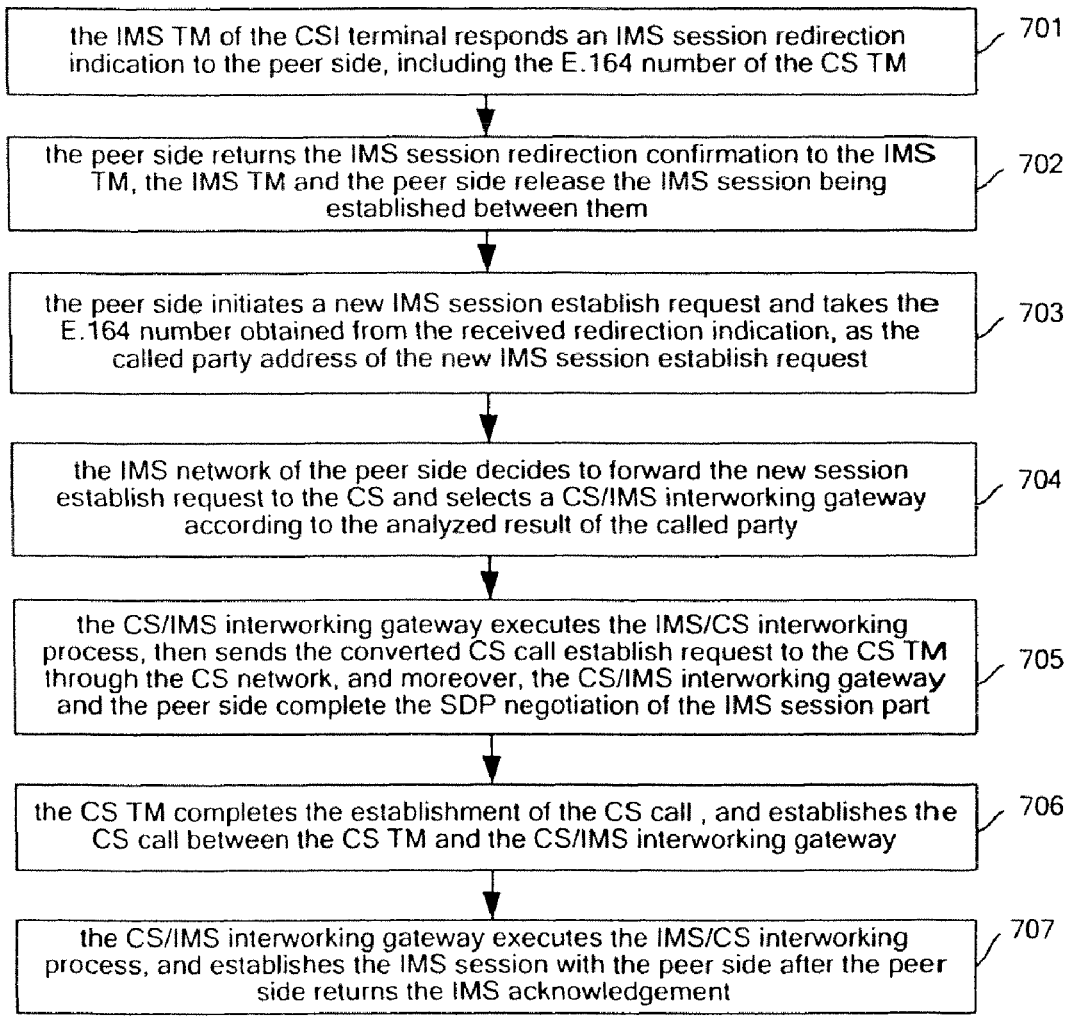
FIG. 7 is a flowchart illustrating a first way of CSI fallback to CS call.

FIG. 7 is a flowchart illustrating the first mode of CSI fallback to CS. With reference to FIG. 7, in terms of the above-mentioned first mode, when the CSI terminal receives an incoming IMS session establish request from the peer side and judges that the CSI service should be triggered, however, it is further found that the conditions for implementing the CSI service are not satisfied currently, the procedure of CSI fallback to CS includes the following steps:

Step 701: the IMS TM of the CSI terminal responds an IMS session redirection indication to the peer side, including the E.164 number of the CS TM.

The E.164 number used by the CS TM for CS call addressing has the ability of indicating the IMS network of the peer side to route the call to the CS; the E.164 number can be the MSISDN of the CS TM subscribed in the CS domain, or the MSISDN of the CS TM subscribed in the CS domain with an additional specific prefix or special identifier.

Step 702: after receiving the IMS session redirection indication, the peer side returns the IMS session redirection confirmation to the IMS TM, the IMS TM and the peer side release the IMS session being established between them.

Step 703: the peer side initiates a new IMS session establish request and takes the E.164 number obtained from the received redirection indication, as the called party address of the new IMS session establish request.

Step 704: the IMS network of the peer side decides to forward the new session establish request to the CS and selects a CS/IMS interworking gateway according to the analyzed result of the called party, i.e. the E.164 number used by the CS TM for the CS call addressing, and then forwards the new IMS session establish request to the selected CS/IMS interworking gateway.

Step 705: the CS/IMS interworking gateway executes the IMS/CS interworking process after receiving the new session establish request, and completes the CS route analysis following the CS standard procedure, then sends the converted CS call establish request to the CS TM through the CS network, and moreover, the CS/IMS interworking gateway and the peer side complete the SDP negotiation of the IMS session part through the IMS network of the peer side.

To be explained, in the above-mentioned step 701, if the E.164 number returned to the peer side by the CSI terminal is formed by adding the specific prefix or the special identifier to the MSISDN number of the CSI terminal, i.e. if the called party number in the new session establish request transmitted in step 703 and step 704 is formed by adding the specific prefix or the special identifier to the MSISDN number of the CS TM, then in step 705, the CS/IMS interworking gateway erases the specific prefix or the special identifier added to the called party number, and completes the interworking procedure with the CS network using the remainder of the MSISDN as the called party number. Furthermore, when erasing the added specific prefix or the special identifier, the CS/IMS interworking gateway can identify the current call as a CSI fallback CS call according to the added specific prefix or the special identifier, therefore, adds a special indication in the CS call control signaling so that the CS network and/or the CS TM can perform a special procedure for the CSI fallback CS call according to the special indication. For example:

the CS network can perform, but are not restricted to, the following special processes according to the special indication added by the CS/IMS interworking gateway:
1. special charging process: e.g. the CS network discharges part of the CS fee according to the special indication;
2. service confliction process: e.g. the CS network can avoid the triggering of intelligent services and the invoking of some supplementary service in the CS domain such as forwarding, call barring, etc., according to the special indication.

The CS TM can perform, but are not restricted to, the following special processes according to the special indication added by the CS/IMS interworking gateway:
1. identifying and prompting the user that the current call is a CSI fallback CS call by way of the pop-up menu, or a kind of special rings, etc.;
2. identifying and prompting the user that the current call is a CSI fallback CS call, thereby performing the procedure of initiating the call diversion under the user's control.

Step 706: the CS TM completes the establishment of the CS call with the corresponding CS network after receiving the CS call establish request, orderly returns to the CS/IMS interworking gateway the CS user ringing and the CS user answering message, and establishes the CS call between the CS TM and the CS/IMS interworking gateway.

Step 707: the CS/IMS interworking gateway executes the IMS/CS interworking process, and maps the above-mentioned process as the corresponding IMS session establish process, orderly returns to the peer side the IMS user ringing and IMS riser answering message through the IMS network of the peer side, and establishes the IMS session with the peer side after the peer side returns the IMS acknowledgement.

Figure 8:
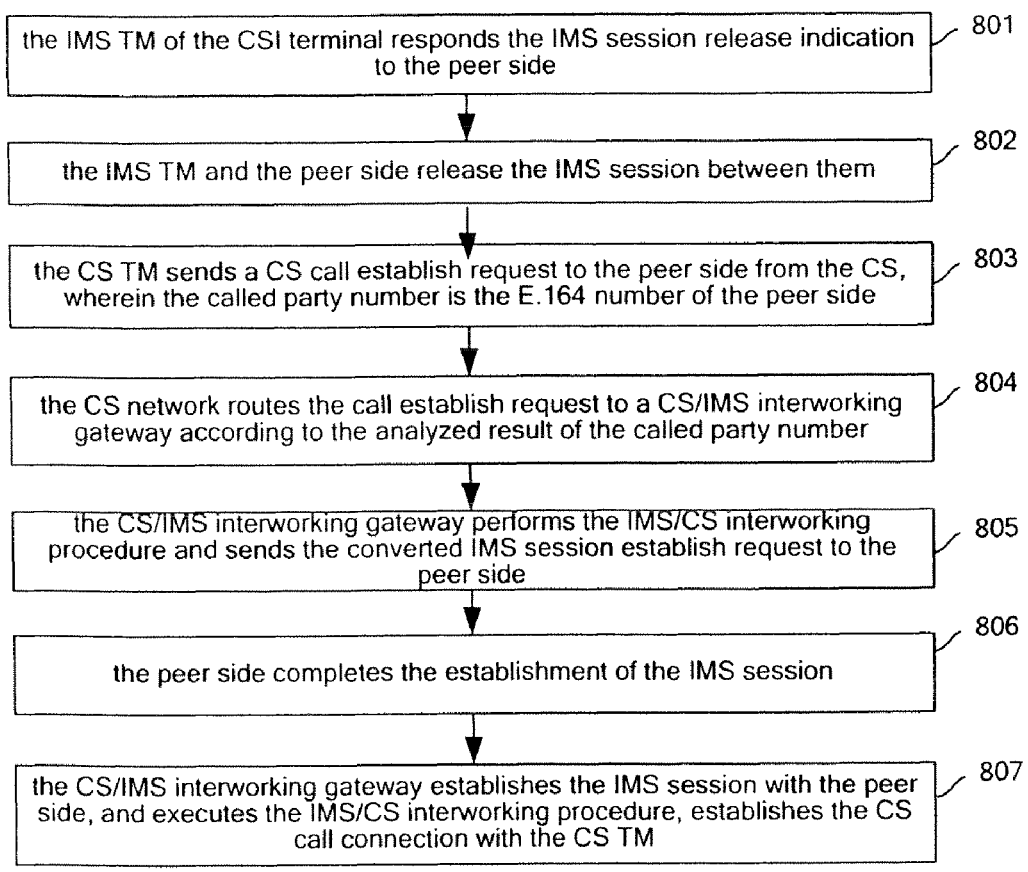
FIG. 8 is a flowchart illustrating a second way of CSI fallback to CS call.

FIG. 8 is a flowchart illustrating the second mode of CSI fallback to CS. With reference to FIG. 8, in terms of the above-mentioned second mode, when the CSI terminal receives an incoming IMS session establish request from the peer side and judges that the CSI service should be triggered, however, it is further found that the conditions for implementing the CSI service are not satisfied currently, the procedure of CSI fallback to CS include the following steps:

Step 801: the IMS TM of the CSI terminal responds the IMS session release indication to the peer side.

The IMS TM can carry the CSI service indication and the number used by the CS TM, i.e. the MSISDN number, in the IMS session release indication. Therefore, when the peer side receives the fallback call initiated by the CSI terminal in the subsequent procedure, the peer side can identify the call.

Step 802: the peer side returns the release acknowledgement to IMS TM after receiving the IMS session release indication, thereby the IMS TM and the peer side release the IMS session being established between them.

If the IMS TM carries the MSISDN number of the CS TM in the IMS session release indication in step 801, then in step 802, the peer side obtains the MSISDN number of the CS TM from the IMS session release indication.

Step 803: the CS TM sends a CS call establish request to the peer side from the CS, wherein the called party number in the call establish request is the E.164 number of the peer side.

The called party number, i.e. the E.164 number of the peer side, can indicate the CS network of the CSI terminal to route the call to the IMS domain, specifically, the called party number can be the MSISDN of the peer side subscribed in the CS domain or the MSISDN with an additional special prefix.

To be explained, the called party number, i.e. the E.164 number of the peer side, is obtained by the CSI terminal from the IMS session establish request sent from the peer side, in other words, in the step 402 in FIG. 4, when the CSI terminal receives an incoming IMS session establish request from the peer side, it obtains the IP Multimedia public identity of the peer side from the "From" header field in the IMS session establish request, and then derives the E.164 number of the peer side according to the obtained IP Multimedia public identity (depending on specific network numbering scheme), or according to the obtained IP Multimedia public identity and the address directory information, or obtained the E.164 number which is carried directly in the IMS session establish request sent by the peer side.

Moreover, in step 803, the CSI terminal can carry the fallback indication in the call establish request initiated by itself, so that in the subsequent procedure, the CS network and/or CS/IMS interworking gateway can perform special process upon the CSI fallback CS call according to the fallback indication.

Step 804: after receiving the call establish request, the CS network routes the call establish request to a CS/IMS interworking gateway, according to the analyzed result of the called party number in the call establish request.

In step 803, if the CS call establish request initiated by CSI terminal selects to add a special prefix to the MSISDN number of peer side to form the called party number, or directly carrying the fallback indication in the CS call establish request, then the CS network of the CSI terminal can perform special processes according to the special prefix or the fallback indication, the mentioned special process include but are not restricted to:
 (1) special charging process: e.g. discharging part of the CS fee;
 (2) service confliction process: e.g. avoiding the triggering of intelligent services and the invoking of some CS originating side supplementary services such as call barring, CUG, etc., which can be performed following current mechanisms of those in the existing CS emergency call or special service.

Step 805: the CS/IMS interworking gateway performs the IMS/CS interworking procedure and sends the converted IMS session establish request to the peer side.

In step 803, if the CS call establish request initiated by CSI terminal selects to add the special prefix to the MSISDN number of peer side to form the called party number, or directly carrying the fallback indication in the CS call establish request, then in step 805, the CS/IMS interworking gateway can perform, but are not restricted to, the process of adding a fallback indication to the converted IMS session establish request it sends to the peer side.

Step 806: after receiving the IMS session establish request, the peer side interacts with the CS/IMS interworking gateway through the IMS network to complete the establishment of the IMS session, and orderly responds to the CS/IMS interworking gateway the IMS user ringing and the IMS user answering message.

If CSI terminal carries its MSISDN in the IMS session release indication in the above-mentioned step 801, and the peer side obtains the MSISDN of CSI terminal in step 802, then in the step 806, the peer side judges whether the MSISDN obtained from the "From" header field in the received IMS session establish request is identical with the obtained MSISDN in step 802, if they are identical, the peer side identifies the current call as a CSI fallback CS call; or, in the above-mentioned step 805, if the CS/IMS interworking gateway carries the fallback indication in the IMS session establish request, then the peer side identifies the current call as a CSI fallback CS call; and then the peer side performs the special processes in current step. The special processes comprise, but are not restricted to, the following:
 (1) identifying the current call as a CSI fallback CS call, and thereby prompting the user that the current call is the CSI fallback CS call by way of the pop-up menu, or a kind of special rings;
 (2) identifying the current call as the CSI fallback CS call, and thereby directly responds the user answering response during the establishment of the session.

Step 807: the CS/IMS interworking gateway establishes the IMS session with the peer side after returning the IMS acknowledgement confirmation to the peer side, the CS/IMS interworking gateway executes the IMS/CS interworking procedure, maps the above-mentioned procedure as the corresponding CS call establish procedure, and orderly responds to the CSI terminal through the CS network the user ringing and the user answering message, and then establishes the CS call connection with the CS TM.

So far, the procedure of CSI fallback to CS call is finished, the CSI terminal can be ensured to implement the communication with the peer side even when the CSI service can not be implemented.

The foregoing description are only the preferred embodiments of this invention and is not to be used for limiting the protection scope of this invention. Any modification, equivalent substitution, improvement, etc. within the spirit and principle of this invention should be covered by the protection scope of this invention.

The invention claimed is:

1. A method for implementing communications, comprising:
 A. an IP Multimedia Subsystem (IMS) Terminal Module (TM) in a Combining Circuit Switched bearer with IP multimedia subsystem (CSI) terminal indicating a Circuit Switched (CS) TM in the CSI terminal to initiate a CS bearer establishment;
 B. the CS TM taking the IMS TM as a called party and sending a call establish request to a CS domain call control function;
 C. the CS domain call control function routing the call establish request to a CS/IMS interworking gateway according to called party number information in the received request;
 D. the CS/IMS interworking gateway converting the received call establish request into an IMS session establish request, and then sending the IMS session establish request to the IMS TM;
 E. the IMS TM performing a correlated control between two sessions, wherein one is between the IMS TM and the CS/IMS interworking gateway, and the other is between the IMS TM and a peer side, so as to implement a CSI service; and
 allocating a Mobile Station International Integrated Services Digital Network (MSISDN) number for the CS TM in advance; wherein
 the step A further comprises the IMS TM obtaining the MISISDN number of the CS TM;
 the step D further comprises the CS/IMS interworking gateway obtaining the MSISDN number of the CS TM according to a calling party number in the received call establish request, and carrying the MSISDN number of the CS TM in a "From" header field in the IMS session establish request sent to the IMS TM; and
 before the IMS TM performing the correlated control process, the step E further comprises the IMS TM obtaining the MSISDN number of the CS TM from the "From" header field in the received IMS session establish request, judging whether the current obtained MSISDN number of the CS TM is identical with the MSISDN number obtained in step A, if they are identical, continuing with the correlated control process.

2. The method according to claim 1, further comprising:
 before step A, the IMS TM judging whether a media component that needs to be transmitted via the CS bearer is comprised in media components to be exchanged within an IMS service, if it is comprised, proceeding to step A.

3. The method according to claim 2, wherein, the IMS TM executes the judging step in at least one of the following cases: preparing to initiate an IMS session establish request to the peer side, receiving an IMS session establish request from the peer side, preparing to initiate a re-negotiation request to the peer side; and, receiving a re-negotiation request from the peer side during an IMS session.

4. The method according to claim 1, further comprising:
before step A, the IMS TM judging whether conditions for implementing the CSI service are satisfied, if the conditions are satisfied, proceeding to step A.

5. The method according to claim 4, wherein, the step of judging whether the conditions for implementing the CSI service are satisfied comprises:
the IMS TM judging whether the currently accessed cell has a simultaneous CS and PS service capability, if the currently accessed cell has a simultaneous CS and PS service capability, the conditions are satisfied.

6. The method according to claim 5, further comprising:
after the IMS TM confirms that the currently accessed cell has the simultaneous CS and PS service capability, and before making a conclusion that the conditions are satisfied, the IMS TM judging whether the user is willing to perform the CSI service, if the user is willing to perform the CSI service, the conditions for implementing the CSI service are satisfied.

7. The method according to claim 6, wherein, the step of the IMS TM judging whether the user is willing to perform the CSI service comprises:
the IMS TM determining whether the user is willing to perform the CSI service by providing a special user interface and receiving an input of the user, or, the IMS TM determining whether the user is willing to perform the CSI service according to the service implementation manner pre-configured by the user.

8. The method according to claim 5, wherein, the IMS TM, as the called party, receiving the IMS session establish request from the peer side,
after confirming that the conditions for implementing the CSI service are not currently satisfied, the method further comprising:
G11. the IMS TM sending an IMS session redirection indication to the peer side, including an addressing number in the CS domain of the CS TM;
G12. the peer side releasing the IMS session being established after receiving the IMS session redirection indication, and initiating another IMS session establish request to the CS TM by taking the addressing number obtained from the redirection indication;
G13. the IMS network of the peer side sending the IMS session establish request to the CS/IMS interworking gateway, according to the called party number in the IMS session establish request from the peer side;
G14. the CS/IMS interworking gateway converting the received IMS session establish request to the call establish request and sending the call establish request to the CS TM through the CS network;
G15. the CS TM establishing the CS call with the CS/IMS interworking gateway through the CS network, and the CS/IMS interworking gateway establishing the IMS session with the peer side.

9. The method according to claim 8, wherein, the addressing number is the MSISDN of the CS TM included in its CS domain subscription.

10. The method according to claim 8, wherein, the addressing number is the MSISDN of the CS TM included in its CS domain subscription with an additional specific prefix or special identifier;
the step G14 further comprises the CS/IMS interworking gateway deleting the specific prefix or the special identifier added to the addressing number;
in step G14, the addressing number transmitted in the CS network is the MSISDN of the CS TM included in its CS domain subscription.

11. The method according to claim 10, wherein, the step G14 further comprises: the CS/IMS interworking gateway adding a fallback indication to the call establish request to be sent, the CS network and/or the CS TM performing the special process of the CSI fallback CS call according to the fallback indication added to the received call establish request.

12. The method according to claim 11, wherein, for the CS network, the special process of CSI fallback CS call comprises a special charging procedure and/or a special service collision procedure;
for the CS TM, the special process of CSI fallback CS call comprises prompting the user that the current call is a CSI fallback CS call, or, prompting the user that the current call is the CSI fallback CS call and further initiating a call deflection procedure under the control of the user.

13. The method according to claim 5, wherein, the IMS TM, as the called party, receiving an IMS session establish request from the peer side;
after confirming that the conditions for implementing the CSI service are not currently satisfied, the method further comprising:
G21. the IMS TM sending an IMS session releasing indication to the peer side, and the peer side releasing the IMS session being established after receiving the IMS session releasing indication;
G22. the CS TM initiating a request asking for establishing CS call in the CS domain, including the E.164 number of the peer side as the called party number;
G23. the CS network routing a call establish request to the CS/IMS interworking gateway after receiving the request asking for establishing CS call, according to the analyzing result of the called party number received from the request sent by the CS TM;
G24. the CS/IMS interworking gateway converting the received call establish request to the IMS session establish request, and sending the IMS session establish request to the peer side through the IMS network of the peer side;
G25. the peer side establishing the IMS session with the CS/IMS interworking gateway, and the CS/IMS interworking gateway performing the CS/IMS interworking procedure to establish the CS call with the CS TM.

14. The method according to claim 13, wherein:
in step G21, the session releasing indication sent to the peer side by the IMS TM carries the addressing number of the CS TM in the CS domain; and
between step G24 and step G25, further comprising: the peer side obtaining the number of the CS TM from the IMS session establish request after receiving the IMS session establish request, and judging whether the obtained number is identical with the number it received in the session releasing indication, if they are identical, the peer side performing the special process of the CSI fallback CS call.

15. The method according to claim 14, wherein, the special process of the CSI fallback CS call comprises: prompting the peer user that current call is a CSI fallback CS call, and further avoiding ringing during the establishment of the session.

16. The method according to claim 1, wherein the step A further comprises,
the IMS TM providing bearer capability indication information required by the current session to the CS TM, and
the bearer capability indication information provided by the IMS TM is carried in the call establish request;
wherein before sending the IMS session establish request, the step D further comprises
the CS/IMS interworking gateway reserving IP port resource including IP address and User Datagram Protocol (UDP) port information according to the bearer capability indication information carried in the call establish request;
wherein the step of the CS/IMS interworking gateway sending the IMS session establish request to the IMS TM comprises
the CS/IMS interworking gateway sending the IMS session establish request to the IMS TM, including the reserved IP address and the UDP port information of the IP port resource;
wherein the step E comprises
the IMS TM correlated controlling the session with the peer side and the session with the CS/IMS interworking gateway in a Back-To-Back User Agent (B2BUA) mode; and
the correlated control process in the B2BUA mode comprises the IMS TM obtaining a Session Description Protocol (SDP) indication from the received IMS session establish request sent from the CS/IMS interworking gateway, taking the SDP indication as a description indication of its own for the part of media component using the CS bearer in the IMS session with the peer side, performing the establishment of the IMS session with the peer side;
wherein, during the procedure of establishing the IMS session with the peer side, the IMS TM obtaining the SDP indication of the peer side for the media component using the CS bearer, taking this SDP indication as its own SDP indication, performing the establishment of the IMS session with the CS/IMS interworking gateway; and
the IMS TM respectively establishing the IMS session with the peer side and the CS/IMS interworking call with the CS TM via the CS/IMS interworking gateway, where the media component using the CS bearer can be transmitted between the IP port resource reserved by the CS/IMS interworking gateway and the peer side via an IP bearer, and then be transmitted between the CS/IMS interworking gateway and the CSI terminal through the CS bearer established between the CS/IMS interworking gateway and the CS TM.

17. The method according to claim 1, wherein, if the IMS TM and the CS TM are not co-located in the same terminal, in step A, the IMS TM obtains the MSISDN of the CS TM through the procedure of real-time interaction or pre-interaction with the CS TM, wherein:
the procedure of obtaining the MSISDN of the CS TM through the real-time interaction comprises the IMS TM firstly sending a request to the CS TM through an interface between them, the CS TM sending its own MSISDN to the IMS TM after receiving the request, and the IMS TM obtaining the MSISDN of the CS TM;
the procedure of obtaining the MSISDN of the CS TM through the pre-interaction comprises when the IMS TM and the CS TM are enabled, the IMS TM sending a request to the CS TM through the interface between them, after receiving this request, the CS TM sending its own MSISDN to the IMS TM, the IMS TM storing the received MSISDN in its buffer and obtains the pre-stored MSISDN of the CS TM from its buffer;
when the IMS TM and the CS TM are co-located in the same terminal, and the MSISDN of the CS TM is stored in a shared data area, in step A, the procedure of obtaining the MSISDN comprises: the IMS TM obtaining the MSISDN of the CS TM from the shared data area.

18. The method according to claim 1, further comprising:
pre-assigning an E.164 number for the IMS TM and configuring called party analysis data for the E.164 number of the IMS TM in the CS domain call control function;
then in step A, the IMS TM providing the E.164 number assigned for it while indicating the CS TM to establish the CS bearer;
and the step A further comprising A0. the CS TM obtaining the E.164 number of the IMS TM;
then the step B comprises the CS TM taking the obtained E.164 number of the IMS TM as the called party number, and sending the request including the number to the CS domain call control function asking for establishing the CS call;
and then in step C, the CS domain call control function routes the call establish request to the CS/IMS interworking gateway according to the E.164 number of the IMS TM, which is taken as the called party number, and the called party analysis data configured in it.

19. The method according to claim 18, wherein the IMS TM and the CS TM are not co-located in the same terminal;
the step A comprises the IMS TM sending the indication of CS bearer establishment including the E.164 number of itself to the CS TM; and
then the step A0 comprises the CS TM obtaining the E.164 number of the IMS TM from the indication of CS bearer establishment.

20. The method according to claim 18, wherein the IMS TM and the CS TM are co-located in the same terminal;
the step A comprises the IMS TM indicating the CS TM to initiate the CS bearer establishment through an internal instruction; and
then the step A0 comprises the CS TM obtaining the E.164 number of the IMS TM from the internal instruction or from the data area shared with the IMS TM.

21. The method according to claim 18, wherein the E.164 number of the IMS TM comprises a prefix identifying an area or a prefix identifying a service type;
then in step C, the CS domain call control function further sending the call establish request to the CS/IMS interworking gateway of the home network of the IMS TM, or to the CS/IMS interworking gateway nearby, according to the analysis of the prefix identifying the area or the service type in the E.164 number.

22. The method according to claim 18, further comprising:
pre-configuring conversion data for a corresponding relationship between the E.164 number of the IMS TM and the Session Initiation Protocol Universal Resource Identifier (SIP URI) of the IMS TM; and
before sending the IMS session establish request to the IMS TM, the step D further comprises the CS/IMS interworking gateway performing an Electronic Numbering (ENUM) server query according to the E.164 number of the IMS TM, which is carried in the call establish request as the called party number, and obtaining the corresponding SIP URI of the IMS TM through the configured conversion data;
wherein, in step D, the CS/IMS interworking gateway converses the call establish request into the IMS session establish request according to the obtained SIP URI of the IMS TM, and then sends the IMS session establish request to the IMS TM.

23. The method according to claim 22, in step D, the procedure of the CS/IMS interworking gateway inquiring the ENUM server further comprises: the CS/IMS interworking gateway determines, according to the query result, whether there is conversion data corresponding to the E.164 number of the IMS TM in the received call establish request, if there exists the conversion data, the CS/IMS interworking gateway confirms that the current CSI service is authorized and continues with the steps of obtaining the SIP URI of the IMS TM according to corresponding conversion data; otherwise, ending current procedure.

24. The method according to claim 1, the step A further comprises the IMS TM providing its own SIP URI to the CS TM;
the step B further comprising the CS TM sending user-to-user information element, including the SIP URI, to the CS domain call control function; and
the step C further comprising the CS domain call control function sending the user-to-user information element including the SIP URI to the CS/IMS interworking gateway; and
the step D comprises the CS/IMS interworking gateway obtains the SIP URI in the user-to-user information element, and converts the call establish request into the IMS session establish request according to the obtained SIP URI and then sends the converted request to the IMS TM.

25. The method according to claim 1, wherein, in step D, the CS/IMS interworking gateway further carries a specific indication information in the SDP indication of the sent IMS session establish request, wherein, the specific indication information is carried by extending the SDP indication of the IMS session establish request; and
the step D further comprises while sending the IMS session establish request to the IMS TM, an IMS Proxy Call and Session Control Function (P-CSCF) identifying the media components that are transmitted by the CS bearer and performs special resource reservations according to the specific indication information.

26. The method according to claim 1, further comprising: after step E, when the session is ended, the IMS TM indicating the CS TM to release the established CS bearer, the CS TM initiating a bearer release request according a standard CS procedure, the CS call control function and the CS/IMS interworking gateway completing the procedure of releasing the established CS bearer after receiving the CS bearer release request, moreover, the CS/IMS interworking gateway completing the release of an IMS call-back session between itself and the IMS TM after receiving the CS bearer release request.

27. The method according to claim 1, wherein, the IMS TM does not support the SIP extension;
the step D further comprises D1, the CS/IMS interworking gateway completing the establishment of the IMS call-back session between itself and the IMS TM by performing the end-to-end negotiation with the IMS TM for signaling interworking between the 3GPP profile of the SIP and non-3GPP SIP usage.

28. The method according to claim 27, wherein, in step D1, by pre-inquiring the ability of the IMS TM, the CS/IMS interworking gateway, selects a manner that does not require to support the SIP extension, to complete the establishment of the IMS call-back session in the IMS domain; or, after receiving an indication of not supporting SIP extension returned by the IMS TM, the CS/IMS interworking gateway re-initiates an IMS session establish request that does not require to support the SIP extension, and then completes the establishment of the IMS call-back session in the IMS domain.

29. The method according to claim 1, further comprising pre-configuring the corresponding relationship between the E.164 number of the CS TM and the E.164 number of the IMS TM in related CS domain call control function; and
the step C further comprises the related CS domain call control function judging whether there is the pre-configured relationship between the calling party number and the called party number in the call establish request when sending the call establish request, wherein the calling party number corresponds to the E.164 number of the CS TM and the called party number corresponds to the E.164 number of the IMS TM, if there is such a relationship, the related CS domain call control function performing the correlated charging with the IMS session.

30. The method according to claim 1, further comprising: pre-assigning a special prefix for the E.164 number corresponding to the IMS TM, and configuring analysis data upon the special prefix in the CS domain call control function, to avoid by analyzing the special prefix the impact on the establishment of the CS bearer introduced by originating side supplementary service and intelligent service;
the E.164 number of the IMS TM further includes the assigned special prefix;
the step C further comprises after receiving the E.164 number of the IMS TM with the special prefix, the CS domain call control function forbidding the invoking of the originating side supplementary service or the triggering of the originating side intelligent service which may influence the establishment of the CS bearer during current CS call establishment, according to the configuration data upon the special prefix.

31. The method according to claim 1, wherein, when the CS bearer is abnormally released, the step E further comprises: releasing the established CS bearer between the CS TM and the CS domain call control function, and the CS bearer between the CS domain call control function and the CS/IMS interworking gateway; and the CS/IMS interworking gateway releasing the IMS session with the IMS TM; then the IMS TM establishing the PS bearer by the re-negotiation procedure, and exchanging the media components with the peer side using the established PS bearer, instead of the previous CS bearer.

32. A system for implementing communications, comprising:
a Circuit Switched (CS) Terminal Module (TM), wherein a first terminal device comprises the CS TM;
an IP Multimedia Subsystem (IMS) TM, wherein the first terminal device further comprises the IMS TM or wherein a second terminal device comprises the IMS TM;
a CS domain call control function, used for interacting and establishing a CS bearer with the CS TM, and routing a call establish request to a CS/IMS interworking gateway;
the CS/IMS interworking gateway, used for converting a call establish request routed from the CS domain call control function, into an IMS session establish request, and sending the IMS session establish request to the IMS TM, which correlated with the CS TM initiating the request for the CS bearer establishment, through an IMS session control function, thus establishing a CS to IMS interworking call between the CS TM and the IMS TM;

moreover, the CS/IMS interworking gateway is used for sending the IP address and port information of the IP port resource it reserved for exchanging media components to the IMS TM, and transferring the media components it received from the IMS side to the CS TM, using the IP port, through the CS bearer established between the CS/IMS interworking gateway and the CS TM, and vice versa;

the IMS TM, used for implementing CS bearer control function, judging and indicating the CS TM to initiate the CS bearer establishment during an IMS service, completing the correlated control upon the two sessions it established respectively with the peer side and the CS/IMS interworking gateway in a Back-To-Back User Agent (B2BUA) mode after receiving the IMS session establish request which is sent from the CS/IMS interworking gateway, and therefore, making the media components, which is destined to the IMS TM, be transmitted by the peer side to the IP port the CS/IMS interworking gateway reserved for exchanging the media components with the IMS TM, and then be transmitted to the CSI terminal through the CS bearer established between the CS TM and the CS/IMS interworking gateway;

the CS TM, used for initiating a call establish request by taking the IMS TM as a called party after receiving an instruction from the IMS TM, and completing the establishment of the CS bearer by interacting with the CS/IMS interworking gateway;

wherein the IMS IM is further used for obtaining a Mobile Station International Integrated Services Digital Network (MSISDN) number allocated for the CS TM;

the CS/IMS interworking gateway is further used for obtaining the MSISDN number of the CS TM according to a calling party number in the received call establish request, and carrying the MSISDN number of the CS TM in a "From" header field in the IMS session establish request sent to the IMS TM; and the IMS TM is further used for obtaining the MSISDN number of the CS TM from the "From" header field in the received IMS session establish request, judging whether the MSISDN number of the CS TM obtained from the "From" header field is identical with the MSISDN number allocated for the CS TM, if they are identical, continuing with implementing the CS bearer control function.

33. The system according to claim 32, wherein, the first terminal device further comprises the IMS TM.

34. The system according to claim 32, wherein, a second terminal device comprises the IMS TM, the CS TM of the first terminal device and IMS TM of the second terminal device communicating with each other by short-distance wireless communication methods; wherein the second terminal device is implemented by a Personal Computer (PC) or a Personal Digital Assistant (PDA).

35. The system according to claim 32, wherein, the CS call control function, is further used for sending a request to the CS TM to establish a CSI fallback CS call when receiving the call establish request to establish the CSI fallback CS call from the CS/IMS interworking gateway, or sending a call establish request to the CS/IMS interworking gateway to establish the CSI fallback CS call when receiving the request to establish a CSI fallback CS call from the CS TM;

the CS/IMS interworking gateway, is further used for converting the IMS session establish request for establishing the CSI fallback CS call into a call establish request for establishing the CSI fallback CS call when receiving an IMS session establish request for establishing the CSI fallback CS call, and sending the call establish request to the CS call control function; or, converting the call establish request for establishing the CSI fallback CS call, which is sent by the CS TM through the CS call control function, into the IMS session establish request for establishing the CSI fallback CS call, and sending the converted request to the peer side;

the IMS TM, is further used for responding an IMS session redirection or releasing indication to the peer side, when receiving the IMS session establish request from the peer side and confirming that the conditions for implementing the CSI service are not currently satisfied, so that releasing the IMS session being established between itself and the peer side;

the CS TM, is further used for establishing a CS to IMS interworking CSI fallback CS call with the peer side through the CS call control function and the CS/IMS interworking gateway, after receiving the request for establishing the CSI fallback CS call sent by the CS call control function; or, used for establishing the CS to IMS interworking CSI fallback CS call with the peer side by initiating the request for establishing the CSI fallback CS call to the CS call control function, taking the peer side as the called party.

\* \* \* \* \*